United States Patent [19]

Kobayashi et al.

[11] Patent Number: 4,663,717

[45] Date of Patent: May 5, 1987

[54] FUEL CONTROL SYSTEM HAVING SENSOR VERIFICATION DUAL MODES

[75] Inventors: Akio Kobayashi, Kariya; Susumu Harada, Okazaki; Takashi Harada, Hekinan; Takehiro Kikuchi, Oobu; Masakazu Honda, Anjo, all of Japan

[73] Assignee: Nippondenso Co., Ltd., Kariya, Japan

[21] Appl. No.: 662,631

[22] Filed: Oct. 19, 1984

[30] Foreign Application Priority Data

Oct. 22, 1983 [JP] Japan .............................. 58-198175

[51] Int. Cl.$^4$ ...................... G01N 27/56; F02M 51/00

[52] U.S. Cl. .............................. 364/431.05; 123/440; 123/489; 204/406

[58] Field of Search .................. 364/431.05; 204/406, 204/425; 123/440, 489

[56] References Cited

U.S. PATENT DOCUMENTS

| | | | |
|---|---|---|---|
| 4,366,039 | 12/1982 | Uchida et al. | 204/406 |
| 4,497,296 | 2/1985 | Nakajima et al. | 123/440 |

FOREIGN PATENT DOCUMENTS

| | | | |
|---|---|---|---|
| 0042914 | 1/1982 | European Pat. Off. | 123/440 |
| 2758273 | 6/1978 | Fed. Rep. of Germany | 123/440 |
| 53-116896 | 10/1978 | Japan . | |
| 57-48648 | 3/1982 | Japan . | |
| 57-192852 | 11/1982 | Japan . | |
| 58-59332 | 4/1983 | Japan . | |
| 0172443 | 10/1983 | Japan | 123/440 |
| 2059643 | 4/1981 | United Kingdom | 123/440 |
| 2083629 | 3/1982 | United Kingdom | 204/406 |

*Primary Examiner*—Parshotam S. Lall
*Attorney, Agent, or Firm*—Cushman, Darby & Cushman

[57] ABSTRACT

In a fuel control system for an internal combustion engine, high and low voltages are applied in succession to an oxygen sensor, the difference between currents generated successively by the sensor in response to the application of the voltages being detected and compared with a predetermined value. The ratio of air-fuel mixture is controlled as a function of the current generated by the sensor in response to the application of one of the high and low voltages when the difference is smaller than the predetermined value and controlled in an open loop mode when the difference is larger than the predetermined value.

9 Claims, 7 Drawing Figures

FUEL CONTROL SYSTEM HAVING SENSOR VERIFICATION DUAL MODES

RELATED APPLICATION

The subject matter of this application is generally related to the subject matter of U.S. application Ser. No. 585,861, filed Mar. 2, 1984, now U.S. Pat. No. 4,543,176, and assigned. These two applications claim different inventions.

BACKGROUND OF THE INVENTION

The present invention relates to a fuel control system for an internal combustion engine. The invention is particularly concerned with a closed loop lean mixture control system responsive to a signal from an oxygen concentration sensor provided in the exhaust system of the engine.

Use has extensively been made of oxygen sensors of the type wherein a current is generated as an indication of oxygen content when a predetermined voltage is applied. With the application of a 0.6-volt potential, the sensor generates a current which varies linearly from zero to 10 milliamperes or higher as a function of oxygen content which varies from zero to 10 percent upward. The current represents a range of air-fuel ratios which correspond to lean mixtures. This occurs only when the sensor is operating at a temperature higher than a predetermined threshold. If the temperature in the sensor's environment is lower than the threshold, the current is not a true indication of oxygen content and this occurs when the engine is started.

SUMMARY OF THE INVENTION

The present invention contemplates the successive application of high and low voltages to an oxygen sensor to detect the difference between the resulting currents to verify that the sensor is active if the difference is smaller than a predetermined value. The fuel control system of the invention for internal combustion engines operates in dual modes, closed loop and open loop. When the sensor is verified as active, the control system operates in closed loop mode to supply fuel as a function of the current generated in response to the higher voltage. The control system switches to open loop mode if the sensor is verified as inactive. At a given operating temperature, lower oxygen content allows the sensor to operate in a greater range of validity than it operates for leaner mixture control. The invention takes advantage of this operating characteristic. Closed loop lean mixture control with a relatively high content of fuel can be effected quickly in response to engine start even if the oxygen sensor is not completely active in a full range of mixture ratios.

BRIEF DESCRIPTION OF THE DRAWINGS

The present invention will be described in further detail with reference to the accompanying drawings, in which.

DETAILED DESCRIPTION

Figure 1:
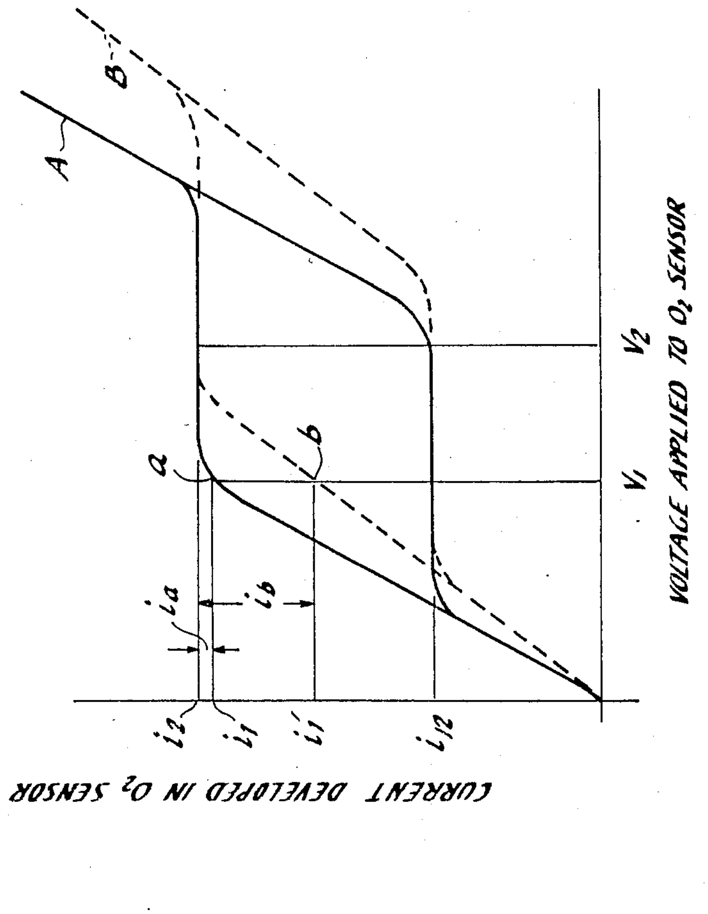

Before undertaking the detailed description of the present invention, it is appropriate to explain the principle of the invention. Solid- and dashed-line curves A and B depicted in FIG. 1 illustrate the operating characteristics of an oxygen sensor. The oxygen sensor develops a current that follows a curve which initially rises rapidly as a function of a potential applied thereto and then assumes a steady current value which indicates the oxygen concentration of the environment and hence the air-fuel ratio of a mixture supplied to an engine. The oxygen sensor is active when heated at a temperature higher than the nominal value and the current developed by the sensor adopts the solid-line curves A and when it remains inactive the gradient of the curve decreases and the current adopts the dashed-line curves B. In FIG. 1, the oxygen sensor is biased at a potential $V_2$ so that it produces steady state currents $i_2$ and $i_{12}$ depending on different oxygen contents. A potential $V_1$, which is lower than $V_2$, is applied so that it crosses the solid-line curve at point a and the dashed-line curve at point b, generating currents $i_1$ and $i_1'$, respectively. It will be appreciated that the difference $i_a$ between currents $i_2$ and $i_1$ is much smaller than the difference $i_b$ between currents $i_2$ and $i_1'$. The present invention takes advantage of the variation of such current differential values to distinguish the current which can be used as a valid indication of air-fuel ratio from the current which is a false indication of air-fuel ratio.

Figure 2:
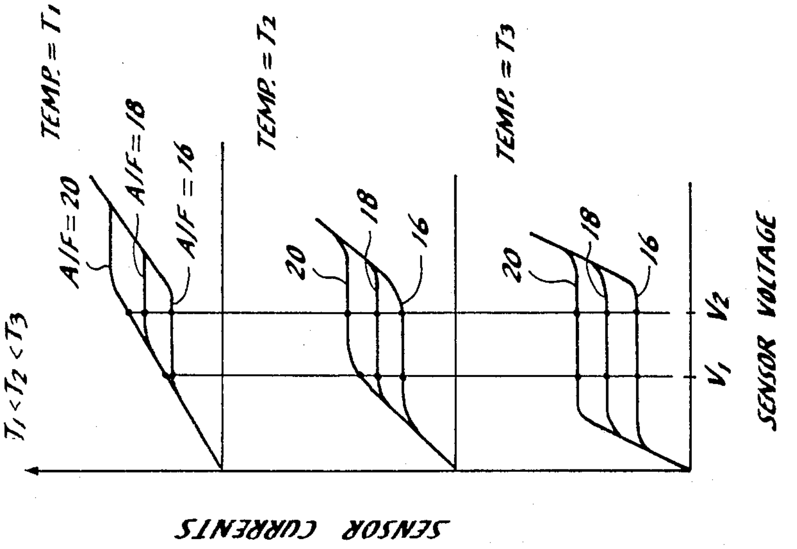
FIGS. 1 and 2 are graphic illustrations of the principle of the present invention.

FIG. 2 illustrates three typical cases in which the temperature of the oxygen sensor is respectively $T_1$, $T_2$ and $T_3$, where $T_1 < T_2 < T_3$. At the lowermost temperature $T_1$, it is seen that voltages $V_1$ and $V_2$ both cross the rising portion of a curve having a stoichiometric value of 20, while they cross the steady state portions of curves having stoichiometric values of 18 and 16. Therefore, current differential values for the 18 and 20 stoichiometric values are greater than normal and the current developed under these conditions are unsuitable for closed loop air-fuel control. Mixture control is performed only for stoichiometric values lower than 16 and is switched to an open loop mode for stoichiometric values higher than 18. At the intermediate temperature $T_2$, voltage $V_1$ crosses the rising portion of a curve having a stoichiometric value 20, while it crosses the steady state portions of curves for stoichiometric values 18 and 16. Voltage $V_2$ crosses the steady state portions of each curve. Therefore, current differential value deviates significantly only when the stoichiometric value is 20 or higher and air-fuel ratio control is effected in closed loop mode for stoichiometric values lower than 18 and switched to open-loop mode for stoichiometric values higher than 20. At the highest temperature $T_3$, voltages $V_1$ and $V_2$ both cross the steady state portions of each curve. The current developed in the sensor under such conditions are valid and closed loop mixture control is performed for lean mixtures.

Figure 3:
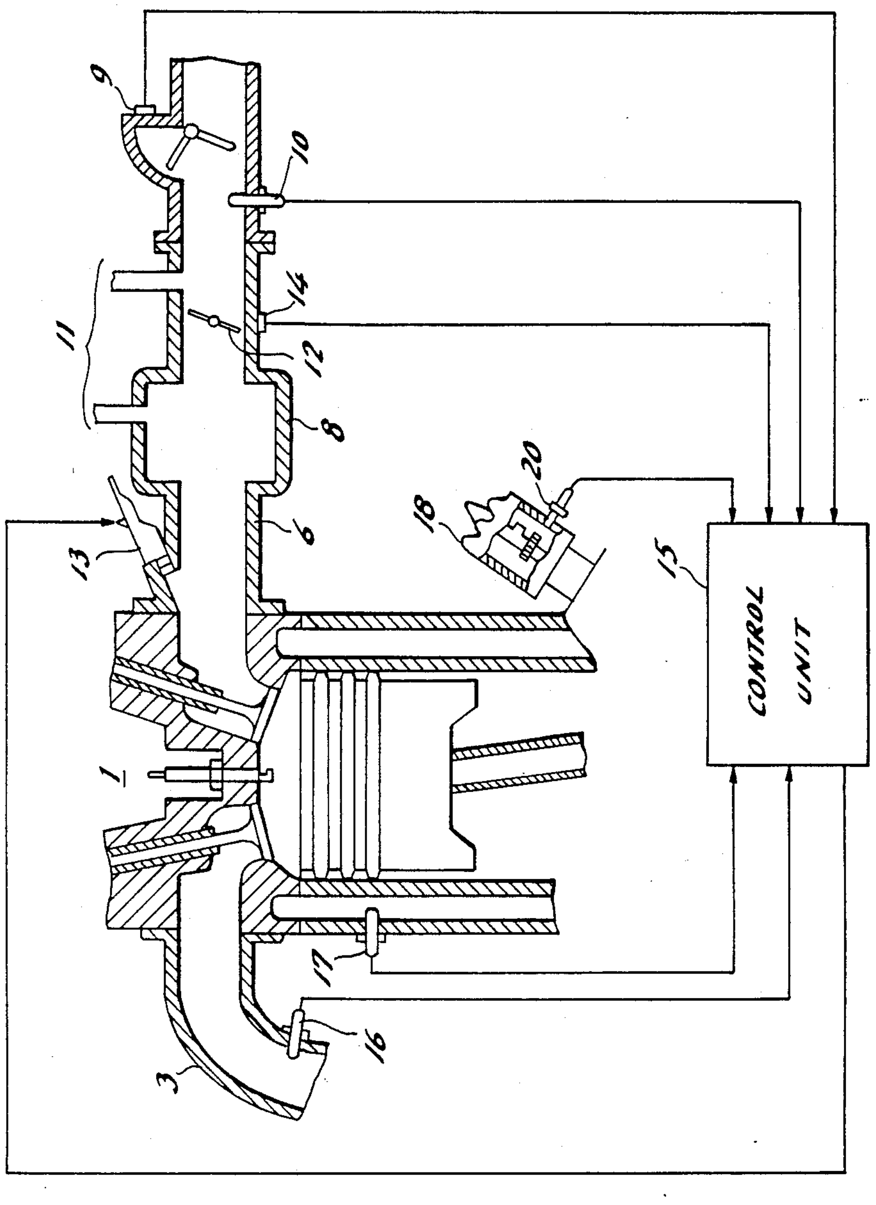
FIG. 3 shows an internal combustion engine and a fuel control unit that controls the fuel supply of the engine.

An internal combustion engine 1 shown in FIG. 3 is provided with an oxygen sensor 16 of the type just described. Mixture control is effected by a control unit 15 which operates in accordance with the principle of the invention. Control unit 15 receives various input data from engine parameter sensors including air-flow meter 9, intake air temperature sensor 10, throttle position sensor 14, engine temperature sensor 17 and engine speed sensor 20 which is mounted on ignition distributor 18. Oxygen sensor 16 is located in the exhaust pipe 3 to sense the oxygen concentration of exhaust emissions to generate a current in a manner as described above as an indication of the ratio of air supplied through intake manifold 6 by a fuel injector 13. Intake manifold 6 includes a throttle valve 12 and a surge tank 8 having a bypass passage 11.

Figure 4:
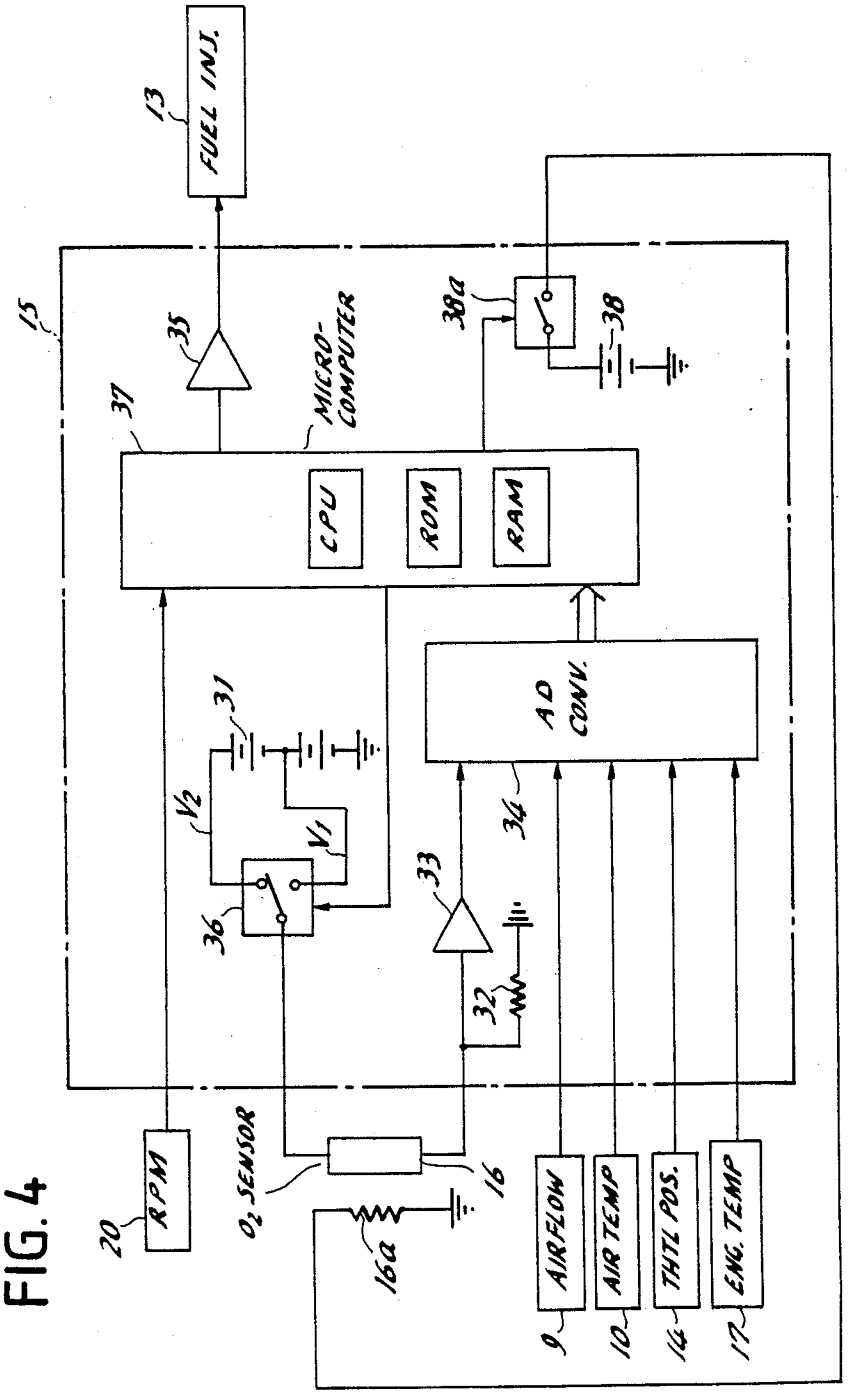
FIG. 4 is a block diagram showing the detail of the control unit.

FIG. 4 illustrates the control unit 15. In FIG. 4, control unit 15 comprises a microcomputer 37 of a conventionally available type including a microprocessor, ROM and RAM. Output signals from sensors 9, 10, 14 and 17 are coupled through an analog-digital converter 34 to the microcomputer and speed sensor 20 output is directly coupled to the microcomputer. According to the present invention, the control unit is provided with a DC voltage source 31 and a switch 36 which is connected to the voltage source 31 so that it selectively applies voltage $V_2$ or $V_1$ to oxygen sensor 16 in response to a control signal provided from the microcomputer 37. Current from oxygen sensor 16 is passed a resistor 32 to ground to develop a voltage which is amplified by a buffer amplifier 33 and fed through the AD converter to microcomputer 37. Further provided is a voltage source 38 which is coupled through a switch 38*a* to a heating element 16*a* in response to a signal from the micromputer. This heating element serves to warm the oxygen sensor when it is not completely active in a manner as will be described. Fuel injection pulses are generated by the microcomputer and applied through amplifier 35 to fuel injector 13.

Figure 5:
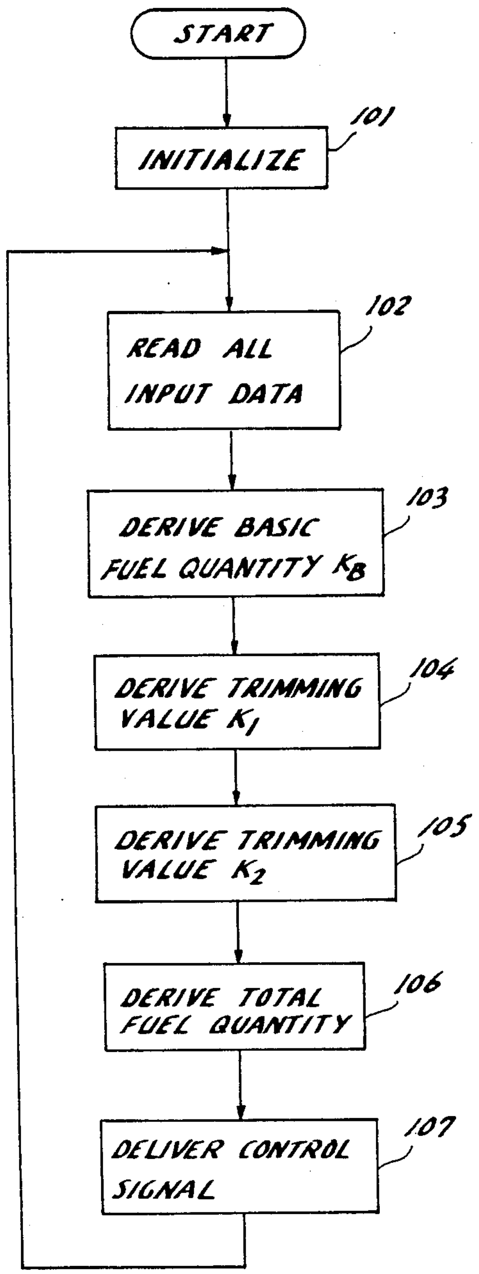
FIG. 5 is a flow diagram of a fuel control main routine by which a microcomputer is programmed.
Figure 6:
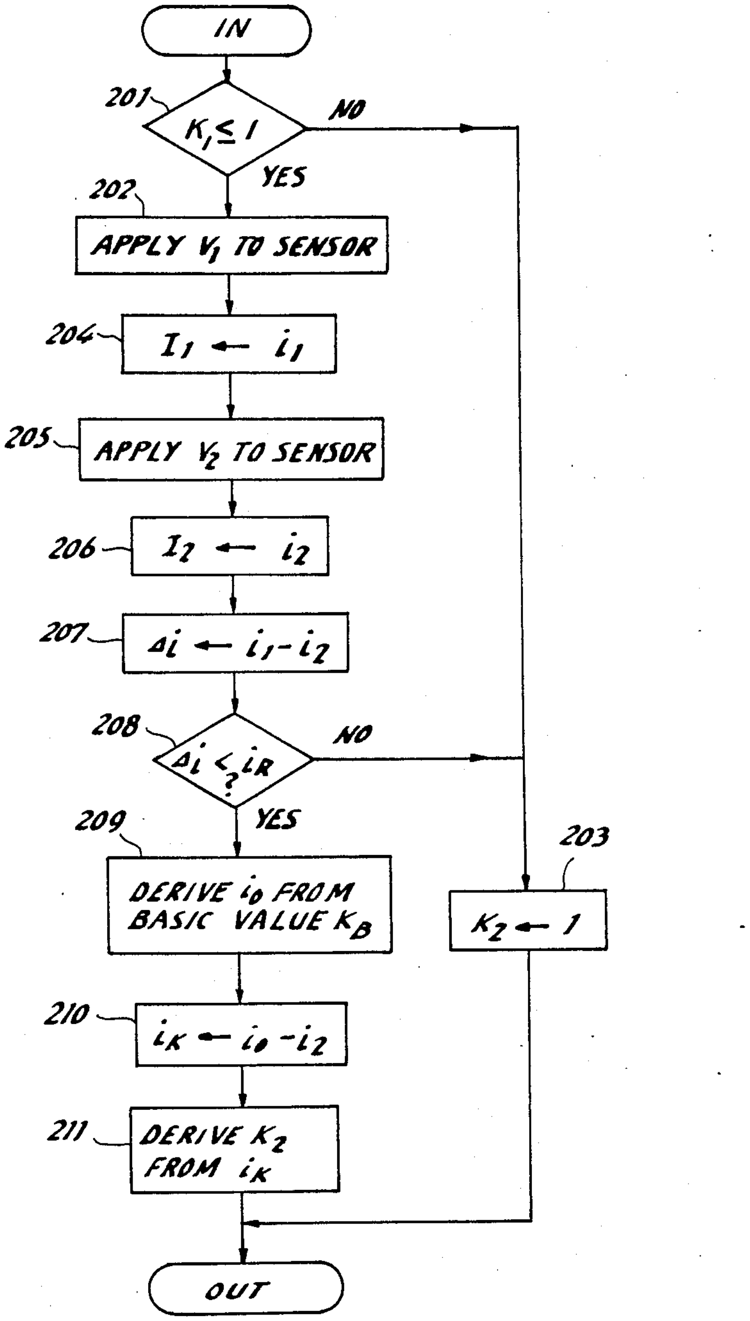
FIG. 6 is a flow diagram showing the detail of sensor verification subroutine.
Figure 7:
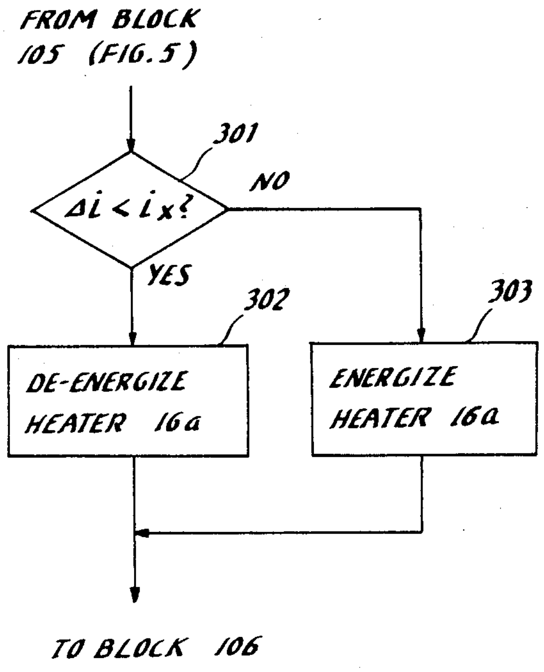
FIG. 7 is a flow diagram of a preferred embodiment.

FIGS. 5-7 are flow diagrams of the method of operation of the engine 1. The flow diagram shown in FIG. 5 is the main routine performed by the microcomputer 37. Start block turns on the main routine in response to operation of the ignition key. This calls for the step of initialization block 10 which sets various engine operating data stored in registers to initial states. The next step in the main routine is indicated by block 102 which directs the reading of all the necessary input data supplied from the engine parameter sensors. Execution block 103 next derives a basic fuel injection quantity KB by addressing a map as a function of the engine speed and air flow parameters data read in block 102. Optimum fuel quantity may be derived by trimming the basic fuel quantity with as many trimming values as necessary. For purposes of explanation, however, the fuel basic value $K_B$ is corrected first and second trimming values $K_1$ and $K_2$. The first trimming value $K_1$ is derived in block 104 for purposes of compensating for engine torque necessary during the start of the engine and during engine acceleration. This trimming value is calculated from the engine temperature and intake air temperature data.

The second trimming value $K_2$ is derived in block 105. This trimming value is used to compensate for the deviation of air-fuel ratio of the mixture supplied to the engine as represented by oxygen sensor 16 from an optimum value which varies as a function of engine parameters. Details of block 105 will be described later. The basic fuel value $K_B$ is corrected by $K_1$ and $K_2$ in block 106 and the corrected fuel data is delivered to fuel injector 13 (block 107). Control returns to block 102 to read new input data to repeat the process.

In FIG. 6, the $K_2$ calculation subroutine starts with block 201 which determines if the engine is operating in a steady state or a rich mixture mode such as encountered in boosting fuel supply during engine warmup or engine acceleration. Specifically, the microprocessor checks to see if the first trimming value $K_1$ is equal to or smaller than unity which indicates that there is no extra amount of fuel to be added for increasing engine power. If $K_1 \leqq 1$, exit from decision block 201 is to block 202, and if not, the microprocessor interprets it as an engine transient condition and exits to block 203 to reset the $K_2$ value to unity, which disables the closed loop air-fuel control. The microcomputer signals the switch 36 to apply voltage $V_1$ to oxygen sensor 16. Block 204 detects current $i_1$ developed in sensor 16 and writes it in a memory location designated $I_1$. Control proceeds to block 205 to switch the sensor voltage to $V_2$ to detect current $i_2$ (block 206) and write it in a second memory location designated $I_2$. Block 207 reads the stored current values $i_1$ and $i_2$ from the memory locations and takes the difference between them to derive a differential value $\Delta i$. Decision block 208 then checks to see if $\Delta i$ is smaller than a threshold value $i_R$ which represents the decision threshold by which the operating condition of the oxygen sensor is determined. If the threshold $i_R$ is exceeded, the microprocessor interprets the sensor current as a false indication and goes to block 203 to reset the $K_2$ value to 1. If the differential current value $\Delta i$ is below the threshold $i_R$, the microprocessor interprets it as a valid indication and proceeds to derive the air-fuel compensation value $K_2$. This is derived in blocks 209 through 211. In block 209, a current value $i_o$ which would flow in the oxygen sensor when the mixture ratio is at optimum, is derived from the basic fuel quantity $K_B$ as by addressing memory storing parameters io as a function of the parameter $K_B$. Block 210 determines a difference $i_K$ between $i_o$ and $i_2$. The difference $i_k$ represents the amount of deviation of air-fuel ratio from the optimum value. In block 211, the $K_2$ value is calculated from the difference $i_K$.

It is appreciated that the present invention has an advantage of operating the engine in closed loop lean mixture control mode with a relatively higher content of fuel even when the oxygen sensor is not completely active. In the present invention lean mixture closed loop operation can be commenced quickly in response to the starting of engine.

It is advantageous to warm the oxygen sensor 16 by heater 16*a* when the sensor is not sufficiently active, namely, the sensor is operating at a level slightly below the active-inactive decision threshold $i_R$. This heating operation is illustrated in FIG. 7. Following the $K_2$ calculation block 105, FIG. 5, block 301 compares the differential current value $\Delta i$ derived in block 301 with a threshold $i_x$ which is smaller than the reference $i_R$. If $\Delta i$ is larger than $i_x$, the sensor 16 is regarded as not being sufficiently active and control exits to block 303 to energize the heater 16*a* to accelerate the operation of the sensor. If $\Delta i$ is smaller than $i_x$, the sensor is sufficiently active and control exits to block 302 to de-energize the heater 16*a*. Blocks 302 and 303 are followed by block 106 of FIG. 5

What is claimed is:

1. A method for detecting an inactive state of an oxygen concentration sensor adapted to be mounted in an exhaust system of an internal combustion engine, the sensor being of the type which generates a current linearly proportional to the oxygen concentration of emissions exhausted from the engine as a representation of mixture ratios leaner than a stoichiometric value thereof when said sensor is biased at a predetermined constant voltage during an active state thereof, comprising:

(a) applying high and low voltages in succession to said sensor as said predetermined constant voltage;
(b) detecting a difference between currents generated successively by said sensor in reponse to the application of said high and low voltages to the sensor; and
(c) comparing said difference with a predetermined value to determine that said sensor is in said inactive state when said difference is larger than a predetermined value.

2. A fuel control system for an internal combustion engine, comprising:

means for supplying a mixture of air and fuel to said engine at a controlled ratio;
an oxygen concentration sensor provided in an exhaust system of said engine, the sensor being of the type which conducts a current linearly proportional to the oxygen concentration of emissions exhausted from the engine as a representation of mixture ratios leaner than a stoichiometric value thereof when said sensor is biased at a predetermined constant voltage during an active state thereof; and
control means for applying high and low voltages in succession to asid sensor as said predetermined constant voltage, detecting a difference between currents generated successively by said sensor in response to the application of said high and low voltages to the sensor, comparing said difference with a predetermined value, and controlling said ratio as a function of the sensor current in response to the application of one of said high and low voltages thereto when said difference is smaller than said predetermined value and controlling said ratio in an open loop mode when said difference is larger than said predetermined value.

3. A fuel control system as claimed in claim 2, wherein said control means includes means for controlling said ratio richer than said stoichiometric value during said open loop mode.

4. A fuel control system as claimed in claim 2, further comprising a heater for heating said oxygen concentration sensor, wherein said control means includes means for energizing said heater when said difference is greater than a second predetermined value.

5. A fuel control system as claimed in claim 4, wherein said second predetermined value is smaller than the first-mentioend predetermined value.

6. A method for controlling an air-fuel mixture supplied to an internal combustion engine, the fuel control system including means for supplying a mixture of air and fuel to said engine at a controlled ratio, and an oxygen concentration sensor provided in an exhaust system of said engine, the sensor being of the type which conducts a current linearly proportional to the oxygen concentration of emissions exhausted from the engine as a representation of mixture ratios leaner than a stoichiometric value of thereof when said sensor is biased at a predetermined constant voltage during an active state thereof, the method comprising:

(a) applying high and low voltages in succession to said sensor as said predetermined constant voltage;
(b) detecting a difference between currents flowing successively through said sensor in response to the application of said high and low voltages to the sensor;
(c) comparing said difference with a predetermined value; and
(d) controlling said ratio as a function of the current generated by said sensor in response to the application of one of said high and lwo voltages thereto when said difference is smaller than said predetermined value and controlling said ratio in an open loop mode when said difference is larger than said predetermined value.

7. A method as claimed in claim 6, further comprising the step of controlling said ratio richer than said stoichiometric value during said open loop mode.

8. A method as claimed in claim 6, further comprising heating said oxygen concentration sensor when said difference is greater than a second predetermined value.

9. A method as claimed in claim 8, wherein said second predetermined value is smaller than the first-mentioned predetermined value.

* * * * *